United States Patent [19]

Mizuno et al.

[11] Patent Number: 4,700,078

[45] Date of Patent: Oct. 13, 1987

[54] METHOD AND APPARATUS FOR DETECTING TIRE INFORMATION MARK

[75] Inventors: Tetsuo Mizuno; Yoshio Marumoto; Kouji Yamada, all of Kodaira, Japan

[73] Assignee: Bridgestone Corporation, Tokyo, Japan

[21] Appl. No.: 885,637

[22] Filed: Jul. 15, 1986

[30] Foreign Application Priority Data

Feb. 7, 1986 [JP] Japan .................................. 51-24214

[51] Int. Cl.⁴ .............................................. G06K 7/10
[52] U.S. Cl. ...................................... 250/566; 382/65; 382/58; 235/454
[58] Field of Search ................... 250/566, 568; 382/58, 382/65, 66, 67, 68, 55, 8, 106; 235/454, 470, 471, 462, 464

[56] References Cited

U.S. PATENT DOCUMENTS

| | | | |
|---|---|---|---|
| 3,163,746 | 12/1964 | Hoeser | 235/454 |
| 3,210,729 | 10/1965 | Lozier, Jr. et al. | 382/66 |
| 3,781,798 | 12/1973 | Hinks | 382/58 |
| 3,930,141 | 12/1975 | Koyama et al. | 382/65 |
| 4,549,206 | 10/1985 | Suzuki et al. | 382/8 |

FOREIGN PATENT DOCUMENTS 60-48578 6/1985 Japan ..................................... 382/65

Primary Examiner—David C. Nelms
Assistant Examiner—Chung K. Seo
Attorney, Agent, or Firm—Sughrue, Mion, Zinn, Macpeak & Seas

[57] ABSTRACT

Tire information marks for denoting tire kind, tire size, etc. formed in a surface of side wall of tire as protrusion or groove having a triangular cross section are optically detected by illuminating the surface of side wall of tire from a first direction substantially perpendicular to the surface of side wall of tire and a second direction inclined with respect to the surface of side wall of tire, and picking up an image of the surface of side wall of tire thus illuminated from the two different directions to derive an image signal. The image signal thus derived is converted into a bivalent signal, and is thinned to produce a mark pattern. Then the mark pattern is compared with a thick standard mark pattern. When a substantial part of the detected mark pattern is included in the standard mark pattern, the detected mark pattern is recognized to be identical with the standard mark pattern.

13 Claims, 12 Drawing Figures

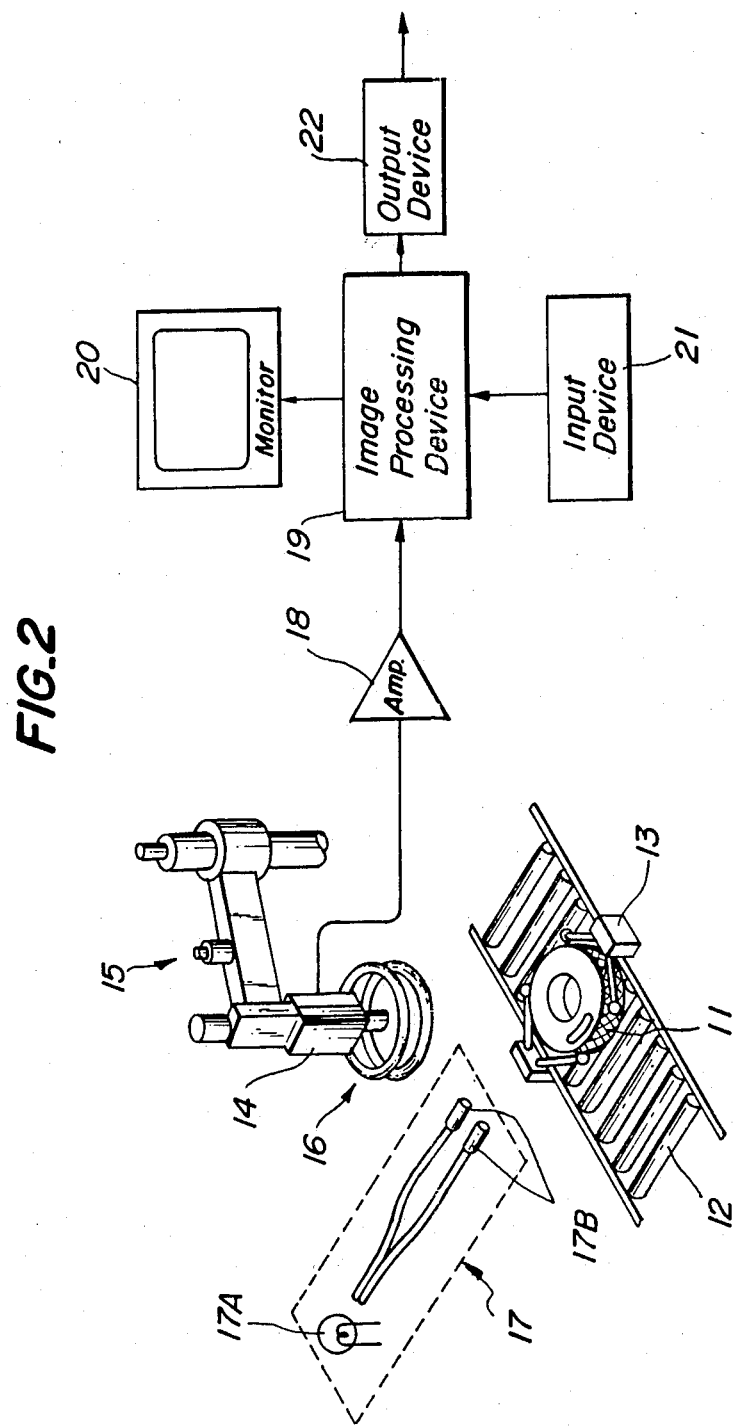

METHOD AND APPARATUS FOR DETECTING TIRE INFORMATION MARK

BACKGROUND OF THE INVENTION

Field of the Invention and Related Art Statement

The present invention generally relates to a technique for detecting automatically characters, numerals and marks engraved in a side wall of tire to derive tire information such as kind, size and shape of tire.

Heretofore, in order to classify or identify various tires, an operator reads visually characters, numerals and marks provided on side walls of tires in the form of protrusion or groove, tread patterns or color marks. Hereinafter, these characters, numeals and marks are called tire information marks. The number of sizes, shapes and kinds of tires has become very large in accordance with various needs of users. Therefore, the visual classification might cause human errors and labor work of the operator might be severe. Under the above circumstances it has been earnestly desired to develop a method of automatically reading the tire information marks. There have been proposed various methods for detecting automatically the tire information marks. In one method disclosed in Japanese Patent Application Laid-open Publication No. 63,843/75, a side wall of tire is illuminated and is optically picked up by a camera head including imaging lens and image sensor, while the tire and camera head are relatively rotated at a constant speed. An image signal supplied from the image sensor is suitably processed to detect the marks. It has been also proposed to provide a bar code of crenelated construction on the side wall of tire and the bar code is mechanically read by means of a bar code reader comprising a limit switch. Further it is also known to apply a label having a bar code printed thereon on the tire and to read the bar code optically. It is further proposed to print marks directly on the tire surface and to read the marks optically. It is also known to record marks on the tire surface with a fluorescent ink and to read the marks by illuminating them with the aid of a fluorescent lamp.

However, all the above explained methods are not satisfactory and have serious drawbacks in the practical view point. For instance, in case of detecting optically the tire information marks engraved on the side wall of tire, it is very difficult to extract only the desired tire information marks, because there are formed on the side wall of tire various characters and marks other than the tire information marks and these undesired characters and marks might cause noise. It should be noted that a position of the tire information marks on tire viewed in a radial direction differs for various kinds of tires and a height of the side wall is also varied in accordance with a width of tire. Moreover, since the tire information marks have the same color as that of a background, an image of the side wall projected upon the image sensor has a very low contrast. Therefore, a photoelectrically converted signal has a very small signal-to-noise ratio.

In the method of reading optically the engraved bar code, since the operator could not comprehend the bar code, it is very inconvenient. Further, the mechanical bar code reader might be worn soon. In case of using the bar code label, it is quite cumbersome to apply labels onto respective tires. In the known method of printing the marks on the tire, when the printing is effected prior to the vulcanization, the marks might be degraded during the valcanization, and even if the printing is carried out after the vulcanization, the printing operation is troublesome and human error might be introduced. When the special ink is used, the printing operation is further cumbersome, and further the special reading apparatus is required.

The inventors have stuided and analyzed the various methods and found that it is the best to form the tire information marks during the vulcanization and to detect optically the thus formed marks.

In the known method of reading optically the tire information marks which are molded in the side wall of tire during the vulcanization, the side wall of tire is illuminated vertically from a direction which is perpendicular to the surface of side wall and an image of the side wall surface is picked up by a television camera. In such a method, when the tire surface has a high reflectance, light reflected by an inclined side of mark is not substantially made incident upon the camera, but light reflected by a background is almost made incident upon the camera, so that it would be possible to obtain an image of the tire side wall surface having a high contrast. However, in general, the side wall of tire has a very low reflectance and has a scattering property. Therefore, light reflected or scattered by the marks is partially made incident upon the camera and almost all light reflected by the background does not impinge upon the camera. Therefore the contrast of the picked-up image is very low and the mark could not be detected accurately. It is also possible to illuminate the side wall of tire with light from a direction which is inclined or oblique with respect to the surface of side wall and to pick up an image of the side wall from a direction perpendicular to the surface of side wall. Also in this case, the contrast between the mark and background is low and it is difficult to read the marks accurately.

SUMMARY OF THE INVENTION

The present invention has for its object to provide novel and useful method and apparatus for detecting optically tire information marks formed on a side wall of tire as protrusion or groove in an accurate manner without being affected by the very low reflectance of the side wall, so that it is possible to classify or identify tires having low reflectance in a rapid and accurate manner.

According to the invention, a method of detecting optically tire information marks formed on a surface of side wall of tire comprises the steps of;

illuminating the side wall of tire from a first direction substantially perpendicular to the surface of side wall of tire and from a second direction inclined with respect to the surface of side wall of tire;

picking-up an image of the surface of side wall of tire by means of an image pick-up device to produce an image signal; and processing the image signal supplied from the image pick-up device to detect the tire information marks.

According to further aspect of the present invention, an apparatus for detecting optically tire information marks formed on a surface of side wall of tire in the form of protrusion or recess comprises a first light source arranged above a tire for projecting illumination light from a first direction which is substantially perpendicular to a plane parallel to the surface of side wall of tire;

a second light source arranged beside the tire for projecting illumination light from a second direction which is inclined with respect to said plane parallel to the surface of side wall of tire;

means for picking up an image of the side wall of tire to produce an image signal; and means for processing the image signal to detect the tire information marks.

BRIEF DESCRIPTION OF THE DRAWINGS

FIG. 2 is a schematic view showing a whole construction of an embodiment of the tire information mark detecting apparatus according to the invention;

DESCRIPTION OF THE PREFERRED EMBODIMENTS

Figure 1A:
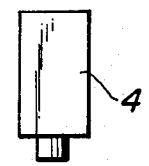
FIGS. 1A to 1D are schematic views explaining the principle of the detecting method according to the invention.
Figure 1B:
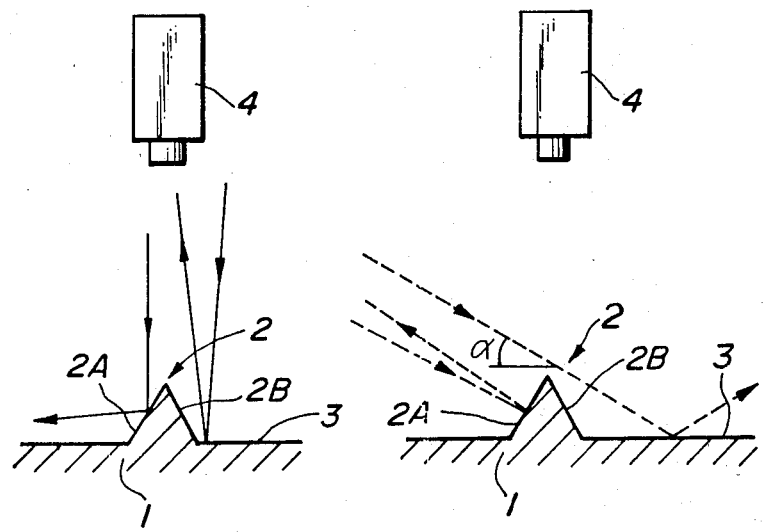

FIGS. 1A to 1D are schematic views for explaining the principle of the detecting method according to the invention. In these figures, a tire information mark 2 is formed on a side wall of tire 1 as a protrusion having a triangular cross section. When the surface of side wall of tire 1 has a relatively high reflectance, vertically incident light rays shown by solid lines and reflected by the mark 2 are not made incident upon an image pick-up device 4 such as a television camera, but light rays impinging upon a background 3 are reflected toward the camera 4 as shown in FIG. 1A. As illustrated in FIG. 1B, oblique light rays shown by broken lines are reflected by the mark 2 and background 3 in different directions than a direction to the television camera 4, and thus are not made incident upon the television camera 4. It should be noted that the oblique light rays are made incident exclusively upon the mark 2 only at its one side 2A. Therefore, the other side 2B of the mark 2 is not illuminated by the oblique light rays. As shown in FIGS. 1A and 1B, when the side wall of tire 1 has a high reflectance, the oblique light rays are not made incident upon the camera 4 and only a part of the vertically projected light rays which illuminate the background 3 is made incident upon the television camera 4. Therefore, the television camera 4 receives a high contrast image having a dark mark in a bright background.

Figure 1C:
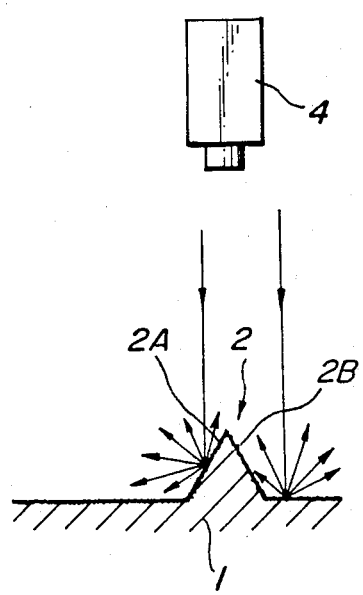
Figure 1D:
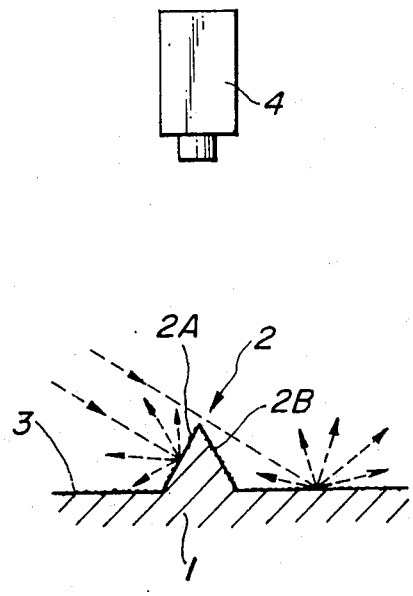

When the side wall of tire 1 has a low reflectance, the vertically projected light rays are scattered by the mark 2 and a part of the light rays is made incident upon the television camera 4 as shown in FIG. 1C. It should be noted that a small part of the vertically projected light rays is reflected by the background 3 toward the television camera 4. As shown in FIG. 1D, the oblique light rays impinging upon the one side 2A of the mark 2 are also scattered and only a small part of the light is reflected by the side 2A toward the television camera 4. The oblique light rays illuminating the background 3 are also scattered thereby and a part of the light is also made incident upon the television camera 4. It should be noted that the other side 2B of the mark 2 is not illuminated by the oblique light rays.

According to the invention, the side wall of tire 1 is illuminated by both the vertical light rays and oblique light rays simultaneously, and an image of the side wall of tire 1 is picked up by the television camera 4 from a direction perpendicular to the side wall of tire 1. Then an amount of light rays reflected by the mark 2 and impinging upon the television camera 4 is always smaller than an amount of light rays reflected by the background 3 and made incident upon the television camera 4 in regardless to the reflectance of the side wall of tire. In this manner, according to the invention it is possible to pick up the image having a very high contrast, in which the dark image of the mark 2 is embossed in the bright background.

According to the invention, when the tire surface has a high reflectance, the contrast is dominantly determined by the vertical illumination light, and when the reflectance of the tire surface is low, the oblique light mainly contributes to the contrast. When the tire surface has an intermediate reflectance value, both the vertical and oblique illumination light rays yield the contrast. Therefore, it is always possible to pick up the image of the side wall of tire having a sufficiently high contrast in regardless to the reflectance of the side wall of tire, and therefore the tire information marks can be detected accurately and rapidly.

FIG. 2 is a schematic view showing an embodiment of the tire information mark detecting apparatus according to the invention. A tire 11 to be identified is transported into a mark detecting position by means of a roller conveyor 12 and then is indexed at a given position by a centering device 13. Above the detecting position is arranged a television camera 14. The television camera 14 is supported by a manipulator 15 movably in x, y and z directions mutually perpendicular to each other so that a mutual position of the tire 11 and television camera 14 can be adjusted at will three-dimensionally. Around the camera 14 is arranged a first light source 16 for projecting illumination light vertically onto the side wall of tire. The first light source 16 comprises two circular fluorescent lamps arranged concentrically. There is further provided a second light source 17 for projecting oblique illumination light onto the side wall of tire along an inclined optical axis. In the present embodiment, the second light source 17 comprises a lamp 17A and a flexible light guide device 17B for guiding light rays emitted from the lamp 17A to the tire 11 along the inclined optical axis.

The television camera 14 picks up an image of the side wall of the tire 11 to produce an image signal. The image signal is supplied to an image processing device 19 via an amplifier 18. In the image processing device 19, the image signal is converted into a bivalent signal, i.e. black and white signal, is thinned and then is compared with a standard mark pattern which is previously stored in the image processing device 19. There are further provided a monitor 20 for displaying the image signal and various signals during the image processing, and an input device 21 comprising a keyboard. A signal for identifying the tire is generated by the image processing device 19 and is supplied to an output device 22 which further supplies given output signals in accordance with the identifying signal to various devices.

Figure 3:
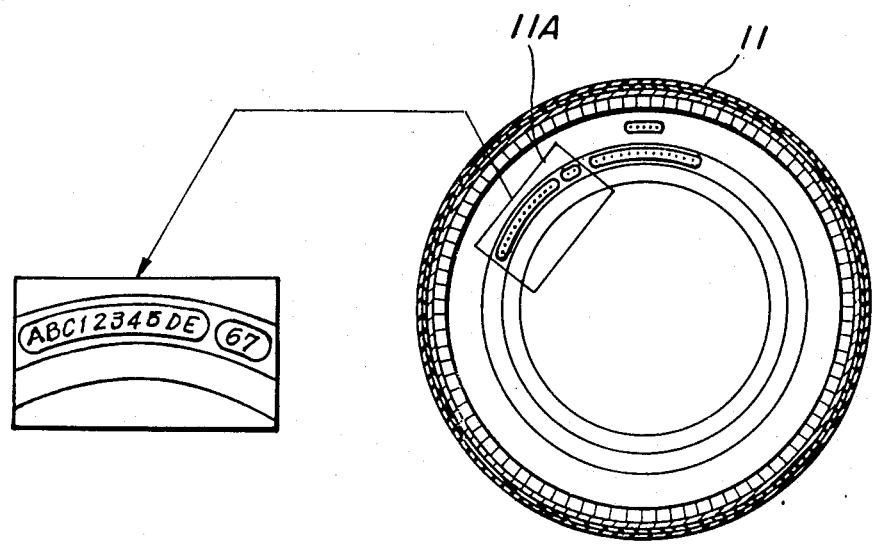
FIG. 3 is a plan view illustrating a tire having tire information marks to be detected by the method according to the invention.
Figure 4A:
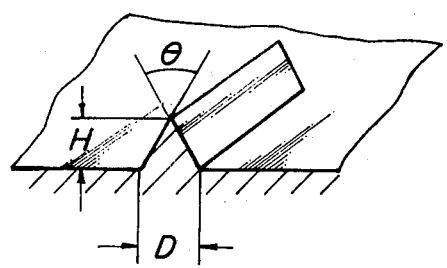
FIGS. 4A and 4B are perspective cross sectional views depicting embodiments of the tire information mark.
Figure 4B:
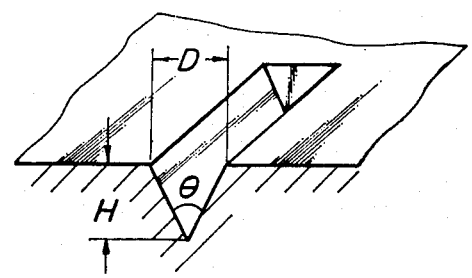

Now the operation of the apparatus will be explained. As illustrated in FIG. 3, on the surface of side wall 11A of the tire 11 there are formed tire information marks in the form of characters and numerals which can be directly comprehended by the operator. According to the invention, the tire information mark can be formed as a protrusion having a triangular cross section as shown in FIG. 4A or as a V-shaped groove as illustrated in FIG. 4B. The tire information marks can be simply formed during the vulcanization by placing a plate having corresponding tire information marks engraved therein on an inner surface of a mold. The inventors have confirmed experimentally that the triangular protrusion or recess has preferably a base width D of 0.4 to 1.0 mm, particularly 0.4 to 0.8 mm, a height H of 0.4 to 1.4 mm, particularly 0.4 to 0.8 mm, and an apex angle $\theta$ of 40° to 140°, particularly 55° to 110°.

As explained above, according to the invention the illumination light rays are simultaneously made incident upon the side wall of tire from the vertical direction and the oblique direction. It has been further found that an oblique angle $\alpha$ (see FIG. 1B) with respect to a plane parallel to the surface of side wall of tire is preferably set to 25° to 45°, particularly 30° to 40°.

Figure 5:
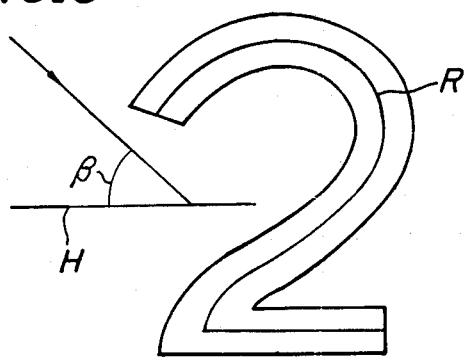
FIG. 5 is a schematic plan view showing a direction of illumination.
Figure 6A:
FIGS. 6A to 6C are schematic views explaining successive steps for recognizing a detected character.
Figure 6B:
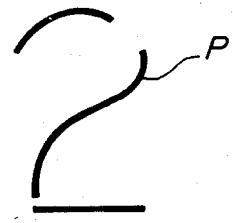
Figure 6C:
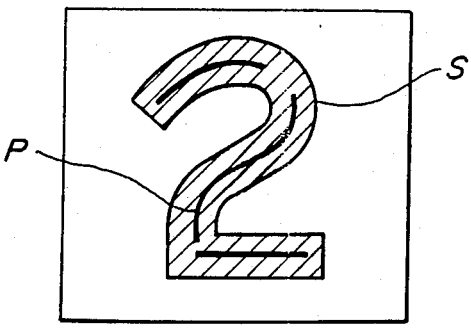

Now it is assumed that a character "2" is formed on the surface of the side wall of tire 11A in the form of a triangular protrusion as illustrated in FIG. 5. Further, the oblique illumination light is projected onto the side wall of tire from a direction which makes an angle of about 20° with respect to a horizontal axis H. In this case, an image to be picked up by the television camera 14 has dark portions corresponding not only to the one side of the triangular protrusion of the mark, but also to the other side thereof in dependence upon the mutual angular relation between the direction of the stroke of character and the direction of the oblique illumination light as shown in FIG. 6A. In FIG. 6A, a thick solid line corresponds to a ridge R of the triangular protrusion of the mark. Therefore, when the image signal supplied from the television camera 14 is converted into a bivalent signal and is then subjected to a thinning treatment in the image processing device 19, a mark pattern does not become continuous, but discrete as illustrated in FIG. 6B. According to the invention, such a broken mark pattern P should be recognized as "2". To this end, there is prepared a thick standard pattern S shown in FIG. 6C, and it is checked whether or not the detected mark pattern P is included in the thick standard pattern S. In this case, if these patterns coincide with each other at more than a given percentage, the detected mark P is recognized to be indentical with the standard mark S. In this manner, it is possible to recognize with a high reliability characters such as "3", "8" and "B" which are hardly delineated from each other in the known method. It should be noted that the present invention is not limited to the above mentioned recognition method, but other recognition methods may be adopted, In any method, it is possible to recognize the tire information marks precisely, because the tire information marks can be detected accurately by the method according to the invention.

The present invention is not limited to the embodiments explained hereinbefore, but many modifications and alternations may be conceived by those skilled in the art within the scope of the invention. For instance, in the above embodiment, the oblique illumination light is made incident upon the tire from the single direction, but the oblique illumination light may be projected from a plurality of different directions. In such a case, the oblique angle $\alpha$ may be different in accordance with different angles $\beta$. Moreover, according to the invention, the side wall of tire should be recognized to include a rim of tire. Further, prior to the detector of the tire information marks, the position of the marks on the tire may be first detected. Then, the marks may be easily and rapidly positioned with respect to the television camera.

As explained above, in the method according to the invention, since the tire surface is illuminated simultaneously with the vertical and oblique illumination light rays and the image of the side wall of tire is picked up by the television camera from the vertical direction, it is always possible to pick up the image having a very high contrast in regardless to the reflectance of the tire surface, and therefore the tire information marks can be read accurately and rapidly. In this manner, the tire can be recognized and identified in a precise and rapid manner, and as the result thereof the tire can be classified reliably and rapidly.

What is claimed is:

1. A method of detecting optically tire information marks formed on a surface of side wall of tire comprising the steps of;
    illuminating the side wall of tire from a first direction substantially perpendicular to the surface of side wall of tire and from a second direction inclined with respect to the surface of side wall of tire;
    picking-up an image of the surface of side wall of tire by means of an image pick-up device to produce an image signal; and
    processing the image signal supplied from the image pick-up device to detect the tire information marks.

2. A method according to claim 1, wherein said second direction from which the side wall of tire is illuminated is inclined with respect to a plane parallel to the surface of side wall of tire by an angle set to 25°–45°, preferably 30°–40°.

3. A method according to claim 1, wherein said image of the surface of side wall of tire is picked up by means of a television camera.

4. A method according to claim 2, wherein the surface of side wall of tire is illuminated from said first direction by means of a circular light source arranged concentrically with an optical axis of the television camera.

5. A method according to claim 1, wherein said step of processing the image signal comprises the steps of:
    converting the image signal into a bivalent signal;
    thinning the thus converted bivalent signal to derive a mark pattern; and
    comparing the mark pattern with a thick standard mark pattern to determine whether or not the mark pattern is identical with the standard mark pattern.

6. A method according to claim 5, wherein said comparing step includes a step of checking whether or not the mark pattern is included in the standard mark pattern.

7. A method according to claim 1, wherein said tire information mark is formed by a protrusion or recess having a triangular cross section whose apex angle is set to 40°–140°, preferably 55°–110°, whose height is set to 0.4–1.4 mm, preferably 0.4–0.8 mm, and whose base width is set to 0.4–1.0 mm, preferably 0.4–0.8 mm.

8. An apparatus for detecting optically tire information marks formed on a surface of side wall of tire in the form of protrusion or recess comprising
    a first light source arranged above a tire for projecting illumination light from a first direction which is substantially perpendicular to a plane parallel to the surface of side wall of tire;

a second light source arranged beside the tire for projecting illumination light from a second direction which is inclined with respect to said plane parallel to the surface of side wall of tire;

means for picking up an image of the side wall of tire to produce an image signal; and means for processing the image signal to detect the tire information marks.

9. An apparatus according to claim 8, wherein said first light source comprises at least one circular lamp arranged concentrically with an optical axis of said picking up means.

10. An apparatus according to claim 9, wherein said circular lamp is formed by a circular fluorescent lamp.

11. An apparatus according to claim 8, wherein said second light source comprises a lamp for emitting light and a flexible light guide device for guiding the light emitted from the lamp and projecting the light toward the side wall of tire along said second direction.

12. An apparatus according to claim 8, wherein said second direction is inclined with respect to said plane parallel to the surface of side wall of tire by an angle which is set to 25°–45°, preferably 30°–40°.

13. An apparatus according to claim 8, wherein said picking up means comprises a television camera and a manipulator for supporting the television camera movably three-dimensionally.

* * * * *